UNITED STATES PATENT OFFICE.

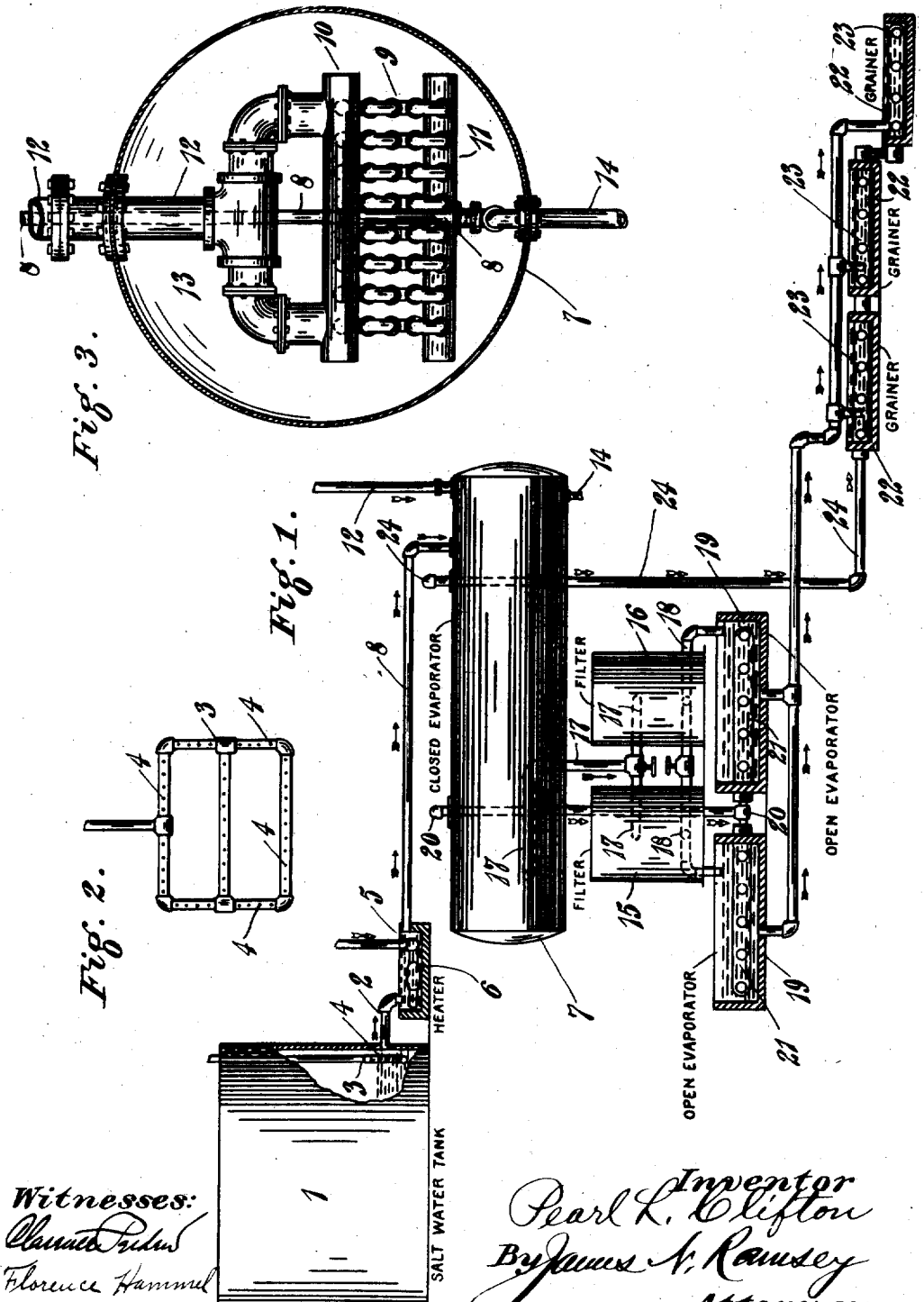

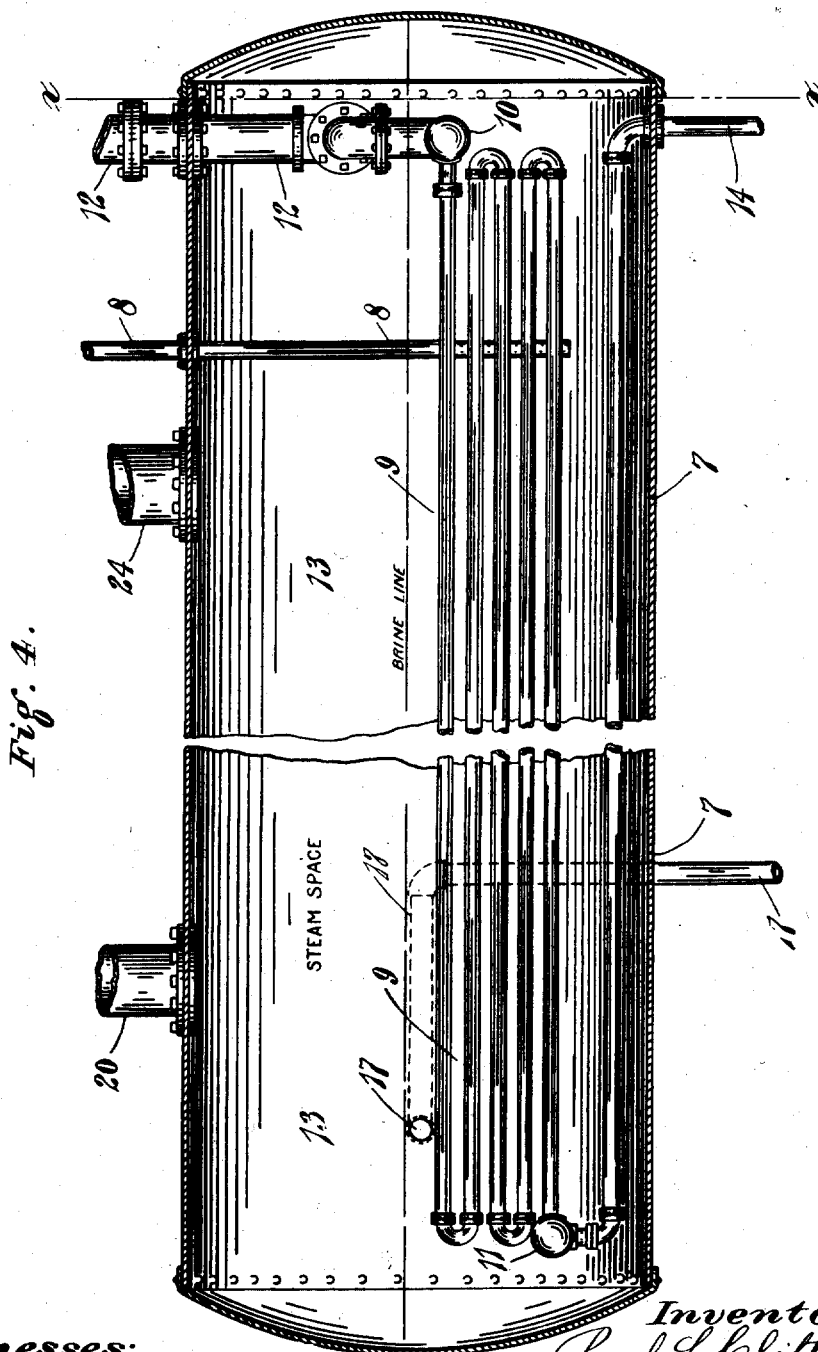

PEARL L. CLIFTON, OF POMEROY, OHIO, ASSIGNOR TO THE POMEROY SALT ASSOCIATION COMPANY, OF POMEROY, OHIO, A CORPORATION OF OHIO.

ART OF MANUFACTURING SALT.

No. 903,357.

Specification of Letters Patent.

Patented Nov. 10, 1908.

Application filed April 25, 1906. Serial No. 313,533.

*To all whom it may concern:*

Be it known that I, PEARL L. CLIFTON, a citizen of the United States, residing at Pomeroy, in the county of Meigs and State of Ohio, have invented certain new and useful Improvements in the Art of Manufacturing Salt, of which the following is a specification.

My invention relates to the manufacture of salt from natural salt brine.

The object of my invention is to simplify and cheapen the manufacture of salt and to improve its quality.

My invention consists in the process herein set forth and claimed.

In the drawings which serve to illustrate one manner of utilizing said process: Figure 1 is a diagrammatic view of a salt making plant in which my process is adapted to be used. Fig. 2 is a side elevation of the aerator. Fig. 3 is a vertical section on the line *x—x* of Fig. 4 showing the pipes in elevation. Fig. 4 is an enlarged longitudinal section of the closed evaporator showing the various pipes in full lines, the center being broken away for lack of space.

The process of manufacturing salt from natural salt brine in accordance with my invention may be accomplished by the use of such apparatus as desired, but in order that my invention may be fully and clearly understood, I prefer employing apparatus constructed and adapted to operate substantially as follows:

A salt brine tank 1 of any suitable construction but preferably cylindrical in form and having an open top and a discharge outlet 2 near its bottom is adapted to be supplied with natural salt brine. Said salt brine tank is provided with an aerator 3 placed therein adjacent to the discharge outlet 2 communicating with air under pressure and is provided with perforations 4 to distribute and thoroughly aerate the brine to oxidize iron therein before it is discharged from the salt brine tank.

A heater 5 comprising an open top receptacle for the brine through the discharge outlet 2 is arranged near the salt brine tank 1. This heater 5 is provided with steam coils 6 distributed therein and adapted to be supplied with steam for the purpose of heating brine in which said coils are immersed from about 60° F. to about 180° F. to oxidize additional iron contained in the brine and to prepare the brine for further treatment. The brine is conveyed from the heater 5 into a closed evaporator 7 by means of a brine tube 8 which extends from near the top of the heater to near the bottom of the closed evaporator. The closed evaporator 7 is provided in its lower part with a series of steam coils 9 secured in and communicating with a manifold 10 at one end and 11 at the other end and supplied with live steam from any suitable source through steam pipe 12 which steam is adapted to circulate through said series of coils which are immersed in the brine to heat the same to a high degree of temperature for the purpose of generating steam from the brine which is collected in the steam space 13 above the brine by which to heat said brine after it is conveyed from said closed evaporator to open evaporators and grainers successively, the brine in said open evaporators and grainers being acted upon simultaneously by steam from said closed evaporator, to oxidize the remaining iron in the brine, to increase the specific gravity of the unevaporated brine and to be exhausted through discharge pipe 14.

The unevaporated salt brine in the closed evaporator is conveyed into and through a filter 15 or 16 by pipe 17 where the oxidized iron and other ingredients deleterious to the salt are mechanically separated from the salt brine which is conveyed therefrom through pipes 18 to open evaporators 19, where it is heated by the steam generated from the salt brine in the closed evaporator 7, the same being conveyed by steam pipe 20 to steam coils 21 immersed in the brine and provided with a suitable discharge outlet through which the condensed steam is exhausted.

The brine in the open evaporators 19 is simultaneously heated and aerated to increase the specific gravity of the brine sufficiently to thoroughly and rapidly precipitate the salt which is contained therein. It is then conveyed into grainers 22 comprising open receptacles which are supplied with steam coils 23 suspended therein above the bottom of each grainer and which are supplied with steam generated from the brine in the closed evaporator 7 and conveyed by steam pipe 24 into said grainers where it passes through the steam coils 23 and said brine is simultaneously heated and aerated sufficiently to precipitate the salt therein, the steam in the coils condensing and being suitably discharged.

The steam generated in the closed evaporator is housed in a space sufficiently large and carried away through pipes of ample size to prevent any appreciable pressure in the closed evaporator upon the unevaporated brine which would retard the evaporation. The great freedom by which the steam from the brine is released from the steam space in the closed evaporator increases the effectiveness and volume of evaporation produced from the salt brine and therefore the necessary specific gravity will be more rapidly obtained and more heat units will be generated in the form of steam than otherwise to be distributed to the coils in the open evaporators and grainers and radiated to the brine contained therein.

I have shown filters 15 and 16 respectively and prefer to use them alternately in order that one may be cleaned while the other is in use and vice versa thus avoiding any interruption in the operation. If desired, however, one filter only may be used.

The method of treatment of the brine according to my invention improves the quality of the salt by thorough removal of such ingredients as are deleterious to the salt and at the same time simplifies and cheapens the manufacture by economy in the use of fuel, saving effected by the utilization of a cheaper grade of fuel and saving in the amount of apparatus required and in the time necessary to obtain the salt from the brine.

My process does not contemplate the creating of a vacuum to assist the evaporation as such vacuum would cause the steam therein to be generated to be no more than warm vapor which would be of no service when carried to the steam coils of the open evaporating tanks or grainers, but my process is economical for the reason that the great heating surface in the proper kind and equipped boilers will produce more heat units with inferior fuel than with the same amount and better quality of fuel consumed under pans, furnaces or kettles and radiate the heat units to the brine through the steam coil in the closed evaporator more uniformly and effectively than by direct heat. The steam passing through the coil is condensed and the condensation returned to the boilers with very slight loss of heat in transmission, thus maintaining a high degree temperature of feed water without use of any fuel or steam to obtain same.

My process is continuous and therefore substantially no loss results. It is an improvement over the method of manufacturing salt in grainers which are supplied with fresh brine.

I claim:

1. In the art of manufacturing salt, the process consisting in, first, aerating the salt brine; next, heating the salt brine while exposed to the atmosphere; next, subjecting the salt brine to a high degree of temperature in a closed evaporator by the application of steam in coils immersed in said salt brine, whereby a portion of the water therein is separated therefrom in the form of steam and released into a steam space within said closed evaporator above said brine; next, discharging the unevaporated brine into evaporators exposed to the atmosphere; and next, discharging the steam evaporated from the brine through steam coils immersed in the brine in said evaporators exposed to the atmosphere, substantially as set forth and for the purposes specified.

2. In the art of manufacturing salt, the process consisting in, first, aerating the salt brine; next, heating the brine while exposed to the atmosphere; next, subjecting the brine to a high degree of temperature in a closed evaporator by the application of steam in coils immersed in said salt brine, whereby a portion of the water therein is separated therefrom in the form of steam and released into a steam space within said closed evaporator above said brine; next, filtering the unevaporator by the application of steam in coils evaporators exposed to the atmosphere; and next, discharging the steam evaporated from the brine through steam coils immersed in the brine in said evaporators exposed to the atmosphere, substantially as set forth and for the purposes specified.

3. In the art of manufacturing salt, the process consisting in, first, aerating the salt brine; next, subjecting the salt brine to a high degree of temperature in a closed evaporator by the application of steam in coils immersed in said salt brine, whereby a portion of the water therein is separated therefrom in the form of steam and released into a steam space within said closed evaporator above said brine; next, discharging the unevaporated brine into evaporators exposed to the atmosphere; and next, discharging the steam evaporated from the brine through steam coils immersed in the brine in said evaporators exposed to the atmosphere, substantially as set forth and for the purposes specified.

4. In the art of manufacturing salt, the process consisting in, first, aerating the salt brine; next, heating the brine while exposed to the atmosphere to about 180° F.; next, subjecting the brine to a temperature of 212° F., or more, in a closed evaporator, whereby a portion of the water therein is separated therefrom in the form of steam and released into a steam space within said closed evaporator, adjacent to said brine; next, discharging the unevaporated brine into evaporators exposed to the atmosphere; and next, discharging the steam evaporated from the brine through steam coils immersed in the brine in said evaporators exposed to the atmosphere, substantially as set forth and for the purposes specified.

5. In the art of manufacturing salt, the process consisting in, first, heating the brine while exposed to the atmosphere to about 180° F.; next, subjecting the brine to a temperature of 212° F., or more, in a closed evaporator whereby a portion of the water therein is separated therefrom in the form of steam and released into a steam space within said closed evaporator adjacent to said brine; next, discharging the unevaporated brine into evaporators exposed to the atmosphere; and next, discharging the steam evaporated from the brine through steam coils immersed in the brine in said evaporators exposed to the atmosphere, substantially as set forth and for the purposes specified.

6. In the art of manufacturing salt, the process consisting in, first, aerating the salt brine; next heating the salt brine while exposed to the atmosphere; next, subjecting the salt brine to a high degree of temperature in a closed evaporator by the application of steam coils immersed in said salt brine, whereby a portion of the water therein is separated therefrom in the form of steam and released into a steam space within said closed evaporator above said brine; next, filtering the unevaporated brine; next, discharging the filtered brine into open evaporators and open grainers successively; and next, subjecting the brine thus exposed to the atmosphere in said open evaporators and grainers to the action of said steam simultaneously, substantially as set forth and for the purposes specified.

PEARL L. CLIFTON.

Witnesses:
H. P. COLLINS,
JAMES N. RAMSEY.